United States Patent
Pratt

(10) Patent No.: US 10,067,676 B2
(45) Date of Patent: Sep. 4, 2018

(54) HYBRID MEMORY DRIVES, COMPUTER SYSTEM, AND RELATED METHOD FOR OPERATING A MULTI-MODE HYBRID DRIVE

(71) Applicant: Micron Technology, Inc., Boise, ID (US)

(72) Inventor: Thomas L. Pratt, Austin, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 15/933,820

(22) Filed: Mar. 23, 2018

(65) Prior Publication Data

US 2018/0210655 A1    Jul. 26, 2018

Related U.S. Application Data

(63) Continuation of application No. 15/227,165, filed on Aug. 3, 2016, now Pat. No. 9,927,975.

(51) Int. Cl.
*G06F 12/00* (2006.01)
*G06F 3/06* (2006.01)
(Continued)

(52) U.S. Cl.
CPC ............ *G06F 3/0604* (2013.01); *G06F 3/068* (2013.01); *G06F 3/0634* (2013.01);
(Continued)

(58) Field of Classification Search
None
See application file for complete search history.

(56) References Cited

U.S. PATENT DOCUMENTS

D610,156 S   *    2/2010   Mudrick .................. D14/480.5
7,861,038 B2      12/2010   Fontenot et al.
(Continued)

FOREIGN PATENT DOCUMENTS

TW    200842887 A    11/2008
TW    200919189 A    5/2009

OTHER PUBLICATIONS

"Kingston DataTraveler Micro Reader", ©2008 Kingston Technology Corporation, p. 1.*
(Continued)

*Primary Examiner* — Brian Peugh
(74) *Attorney, Agent, or Firm* — TraskBritt

(57) ABSTRACT

A multi-mode hybrid memory drive comprises a bulk memory device and a removable cache memory device. A controller of the bulk memory device may be configured to operate the bulk memory device in either a stand-alone mode or a hybrid mode responsive to detecting the removable cache memory device being coupled with a cache port of the bulk memory device. A method of operating a multi-mode hybrid drive may also comprise monitoring a cache port of a bulk memory device to determine a presence of a removable cache memory device, operating the bulk memory device as a stand-alone drive responsive to determining the removable cache memory device is not present, and operating the bulk memory device as a hybrid drive using the removable cache memory device as a data cache responsive to determining the removable cache memory device is present. Additional hybrid memory drives and computer systems are also described.

20 Claims, 3 Drawing Sheets

(51) Int. Cl.
*G06F 12/0873* (2016.01)
*G06F 12/02* (2006.01)

(52) U.S. Cl.
CPC ...... *G06F 12/0873* (2013.01); *G06F 12/0246* (2013.01); *G06F 2212/217* (2013.01); *G06F 2212/222* (2013.01); *G06F 2212/261* (2013.01); *G06F 2212/281* (2013.01); *G06F 2212/305* (2013.01); *G06F 2212/313* (2013.01)

(56) References Cited

U.S. PATENT DOCUMENTS

| | | |
|---|---|---|
| 9,052,917 B2 | 6/2015 | Seethaler et al. |
| 9,182,915 B2 | 11/2015 | Sutardja |
| 2008/0005462 A1 | 1/2008 | Pyeon et al. |
| 2008/0222353 A1 | 9/2008 | Nam et al. |
| 2008/0244179 A1 | 10/2008 | Kealy et al. |
| 2009/0024793 A1 | 1/2009 | Fontenot et al. |
| 2009/0241103 A1 | 9/2009 | Pennisi et al. |
| 2010/0082936 A1 | 4/2010 | Hobbet et al. |
| 2010/0095053 A1 | 4/2010 | Bruce et al. |
| 2010/0268874 A1 | 10/2010 | Pyeon |
| 2010/0332740 A1 | 12/2010 | Farhan et al. |
| 2012/0233385 A1 | 9/2012 | Meir et al. |
| 2018/0039414 A1 | 2/2018 | Pratt |

OTHER PUBLICATIONS

Smith, Tony, "World's first expandable USB Flash drive launched, sort of", © Feb. 2008, p. 1-2.*
International Search Report from International Application No. PCT/US2017/042508, dated Oct. 13, 2017, 3 pages.
International Written Opinion from International Application No. PCT/US2017/042508, dated Oct. 13, 2017, 3 pages.
Taiwanese Office Action and Search Report from Taiwanese Application No. 106126290, dated Apr. 19, 2018, 14 pages include English translation.

\* cited by examiner

HYBRID MEMORY DRIVES, COMPUTER SYSTEM, AND RELATED METHOD FOR OPERATING A MULTI-MODE HYBRID DRIVE

CROSS-REFERENCE TO RELATED APPLICATION

This application is a continuation of U.S. patent application Ser. No. 15/227,165, filed Aug. 3, 2016, now U.S. Pat. No. 9,927,975, isued Mar. 27, 2018, the disclosure of which is hereby incorporated herein in its entirety by this reference.

TECHNICAL FIELD

The disclosure, in various embodiments, relates generally to the field of computer systems and mass storage devices. More specifically, the disclosure relates to mass storage devices configured to operate as either a hybrid drive or a stand-alone drive depending on its mode of operation.

BACKGROUND

Non-volatile memory is commonly used for mass storage of data, such as within consumer electronic devices. Various types of mass storage devices are currently in use, such as solid state devices (SSDs), hard disk drives (HDDs), and hybrid drives. SSDs use solid state memory devices (e.g., Flash memory), which can have advantages over the traditional electro-mechanical magnetic HDDs due to fast data access times, low power consumption, and no moving mechanical parts. As a result, SSDs have been a popular data storage device for the PC and notebook markets. SSDs, however, are more expensive to produce than HDDs. Thus, HDDs are often the drive of choice when large storage is desired at a lower price.

Hybrid drives include features of both the SSDs and HDDs in that traditional magnetic HDD storage media is used for long term storage and solid state Flash-type storage media is used for cache storage. Thus, hybrid drives have become desirable because they deliver higher performance than conventional drives, but at a more reasonable cost. For example, a hybrid drive can bring more SSD-like performance with the inclusion of Flash memory, but retain the high capacity and some of the lower cost associated with an HDD. As a result, the small amount of solid state memory used in the hybrid drive may result in lower boot times and data access times as well as power savings, but conventional hybrid drives may also limit flexibility in solid state media capacity and add significant complexity for the system manufacturer where multiple hybrid capacity offerings are desired. Because conventional hybrid drives may add complexity to the overall offerings for original equipment manufacturers (OEMs), OEMs may simply offer a smaller set of drive types for consumers to choose from. This same complexity of offerings may exist at the HDD or hybrid drive manufacturer, limiting the number of drive types they may offer as well.

DETAILED DESCRIPTION

Figure 1:
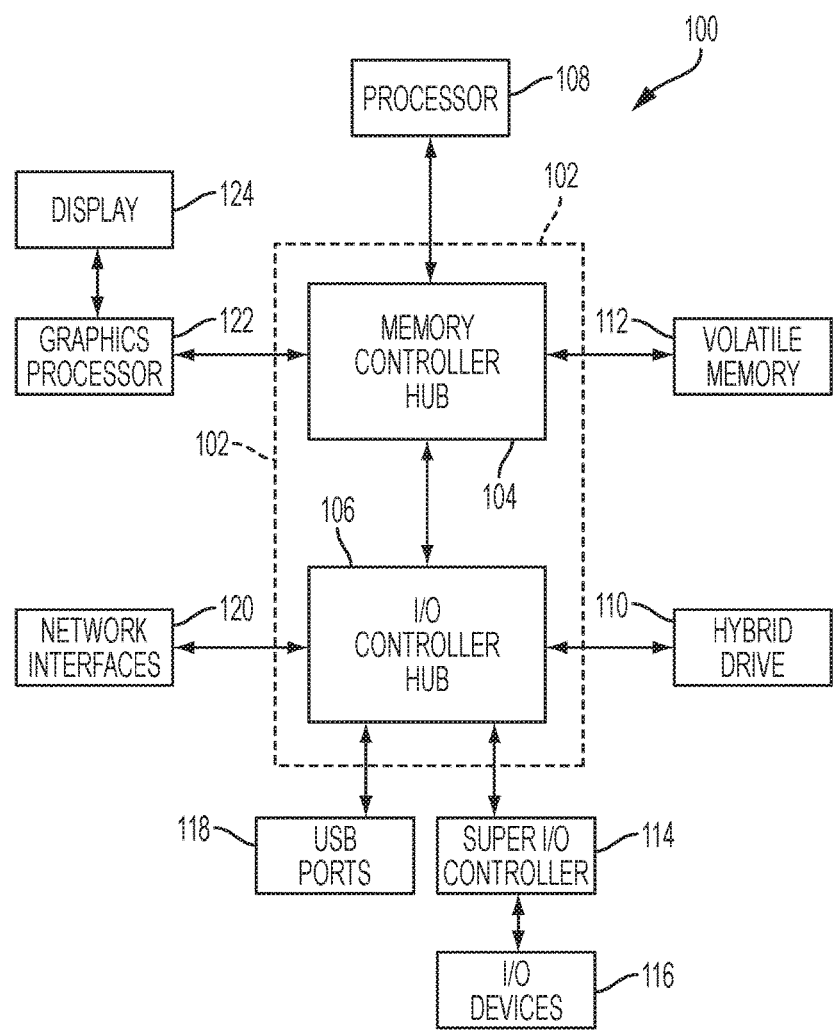
FIG. 1 is a simplified block diagram of a computer system according to an embodiment of the present disclosure.

In the following detailed description, reference is made to the accompanying drawings which form a part hereof, and in which is illustrated specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

The illustrations presented herein are not meant to be actual views of any particular apparatus (e.g., device, system, etc.) or method, but are merely idealized representations that are employed to describe various embodiments of the disclosure. Accordingly, some of the drawings may be simplified for clarity. Thus, the drawings may not depict all of the components of a given apparatus (e.g., device) or all operations of a particular method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a computer because, absent the disclosure, the computer would not be able to carry out the processes of the disclosure. The disclosure also provides meaningful limitations in one or more particular technical environments that go beyond an abstract idea. For example, embodiments of the disclosure provide improvements in the technical field of memory devices, particularly for hybrid drives being configured to operate in either a stand-alone mode or a hybrid mode. Embodiments include features that improve the functionality of the hybrid drive such that a new device and method for operating the hybrid drive are described.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, interfacing with an operating system, etc. Furthermore, the methods disclosed herein may be implemented in hardware, software, or both. If implemented in software, the functions may be stored or transmitted as one or more instructions (e.g., software code, firmware, etc.) on a computer-readable medium. Computer-readable media includes both computer storage media and communication media including any medium that facilitates transfer of a computer program from one place to another.

Embodiments of the present disclosure include a computer system comprising a chipset and a multi-mode hybrid drive operably coupled with the chipset. In some embodiments, the multi-mode hybrid drive is configured to enable a stand-alone mode for the multi-mode hybrid drive responsive to a removable cache memory device not being coupled to a cache port of the multi-mode hybrid drive, and to enable a hybrid mode for the multi-mode hybrid drive responsive to the removable cache memory device being coupled to a cache port of the multi-mode hybrid drive. As used herein, the term "cache port" does not denote any particular required physical structure for coupling a removable cache memory. In addition, the term "cache" is used for convenience to refer to a common usage of a hybrid drive being as a temporary cache of data storage that may be duplicated in the main storage area. In some embodiments, however, it is contemplated that the data stored in the cache may not be duplicated in the main storage area. In such an embodiment, the cache memory device may be considered a different tier of storage from the main storage area such that data in the cache memory device may not necessarily be duplicated in the main storage area or may be temporary in nature.

FIG. 1 is a simplified block diagram of a computer system 100 according to an embodiment of the present disclosure. The computer system 100 may be a consumer electronic device, such as a desktop computer, a laptop computer, a tablet computer, an electronic reader, a smart phone or other type of communication device, as well as any type of computing system (e.g., a server) incorporating non-volatile storage.

The computer system 100 includes a chipset 102 (also referred to as a "host") that includes one or more memory controller hubs 104, 106. In particular, the chipset 102 may include a memory controller hub 104 (also referred to as a "northbridge") and an I/O controller hub 106 (also referred to as a "southbridge"). The memory controller hubs 104, 106 may include one or more processors (e.g., single core, multi-core, etc.). Of course, some embodiments may include an integrated chipset that incorporates the features of the northbridge/southbridge configuration into a single integrated circuit having a single processor die.

The computer system 100 may also include different devices and ports coupled with the chipset 102 through different communication buses. For example, the memory controller hub 104 may be coupled with a processor 108, volatile memory 112, a graphics processor 122, and a display 124. The processor 108 may be the central processing unit (CPU) for the computer system 100. The volatile memory 112 may include random-access memory (RAM) that may also be referred to as "system memory" (e.g., DRAM, SDRAM, LPDDR, etc.). The graphics processor 122 is configured to handle a variety of multimedia tasks responsive to receiving data from the chipset 102 to provide the video display signals to the display 124. The memory controller hub 104 is configured to enable the processor 108, the volatile memory 112, the graphics processor 122 to communicate with each other, as well as to communicate with the devices and ports coupled with the I/O controller hub 106.

The I/O controller hub 106 may be coupled with a hybrid drive 110, as well as other I/O devices and ports such as a super I/O controller 114 and I/O devices 116, USB ports 118, and other network interfaces 120. Of course, it is recognized that the computer system 100 shown in FIG. 1 is a simplified configuration. Other resources and devices may also be included as desired, such as an optical drive (e.g., DVD, BLU-RAY®, etc,). In addition, some components shown as separate may exist in an integrated package or be integrated in a common integrated circuit with other components. Systems may also include a variety of components, including parallel (e.g., redundant) resources. The hybrid drive 110 may be a multi-mode drive that is configured to operate in either a stand-alone mode or a hybrid mode, which will be discussed further below with reference to FIGS. 2 and 3.

In some embodiments, a hybrid memory drive comprises a bulk memory device and a removable cache memory device. The bulk memory device includes bulk storage media, a cache port, and a first controller operably coupled with the cache port and the bulk storage media. The bulk storage media includes non-volatile memory. The removable cache memory device includes cache storage media including non-volatile memory and a second controller operably coupled with the cache storage media. The first controller is configured to operate the bulk memory device in either a stand-alone mode or a hybrid mode responsive to detecting the removable cache memory device being at least one of coupled with the cache port of the bulk memory device or valid for use as a cache for the bulk memory device to operate as a hybrid drive.

In some embodiments, a non-volatile memory drive comprises bulk storage media including physical blocks of non-volatile memory, a cache port, and a controller operably coupled with the bulk storage media and the cache port. The controller is configured to detect whether a removable cache memory device having non-volatile memory is coupled with the cache port, and operate the non-volatile memory drive to use the removable cache memory device as a data cache during at least one of a read or write operation responsive to detecting the removable cache memory device is at least one of coupled or valid for use in with the bulk storage media as a hybrid drive.

The hybrid drive 110 may be coupled with the I/O controller hub 106 using a serial or parallel data bus. For example, the data bus from the hybrid drive 110 to the chipset 102 may include a Peripheral Component Interconnect Express (PCIe) bus, Serial Advanced Technology Attachment (SATA) bus, Parallel Advanced Technology Attachment (PATA) bus, Small Computer System Interface (SCSI) bus, Serial-attached SCSI (SAS) bus, a Universal Serial Bus (USB), or combinations thereof.

Figure 2:
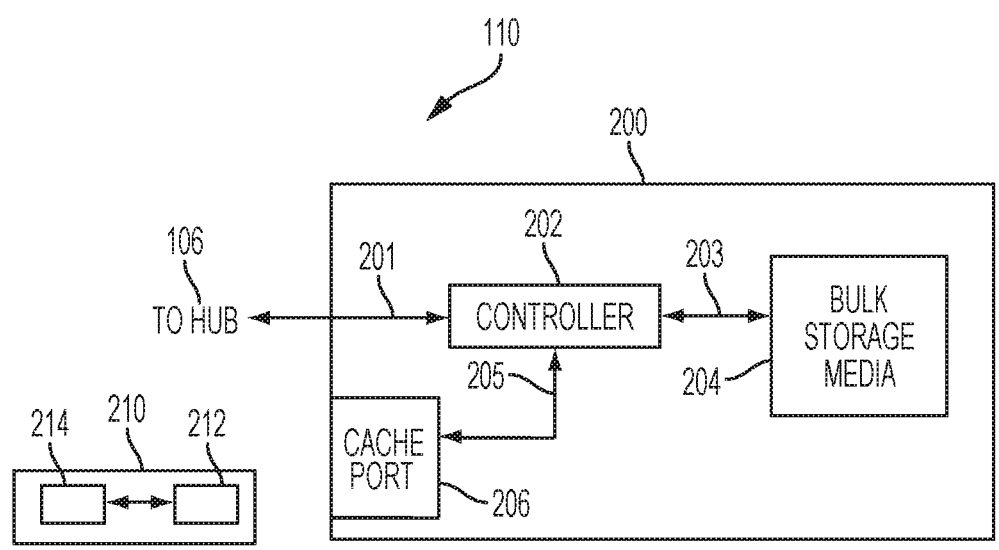
FIG. 2 is a simplified block diagram of the hybrid drive of FIG. 1.

FIG. 2 is a simplified block diagram of the hybrid drive 110 of FIG. 1. The hybrid drive 110 includes a bulk memory device 200 and a removable cache memory device 210. The bulk memory device 200 may be configured to operate in either a stand-alone mode or a hybrid mode responsive to detecting the presence of the removable cache memory device 210 being coupled with the bulk memory device 200. For example, the bulk memory device 200 may be configured to operate in the stand-alone mode if the removable cache memory device 210 is not coupled with the bulk memory device 200, and in the hybrid mode if the removable cache memory device 210 is coupled with the bulk memory device 200.

The bulk memory device 200 may include a first controller 202, bulk storage media 204, and a cache port 206. The first controller 202 of the bulk memory device 200 may be coupled with the I/O controller hub 106 via a first bus 201. The first controller 202 of the bulk memory device 200 may be coupled with the bulk storage media 204 via a second bus 203. The first controller 202 of the bulk memory device 200 may be coupled with the cache port 206 via a third bus 205.

The bulk storage media 204 may include non-volatile memory. Embodiments of the present disclosure include non-volatile memory arrays of a variety of different configurations and capacity. In some embodiments, the non-volatile memory may be configured as an HDD, as an SSD, or as another suitable type of long term data storage. In some embodiments, the HDD may include magnetic media. In some embodiments, the bulk storage media 204 may be configured as solid state media (e.g., an SSD). The solid state media may include memory such as Flash-based memory (e.g., NAND Flash), which may include blocks of single-level cells (SLC), multi-level cells (MLC) (e.g., triple-level cells (TLC), quad-level cells (QLC), etc.), or combinations thereof.

The removable cache memory device 210 may include a second controller 212 operably coupled with cache storage media 214. The cache storage media 214 may also include non-volatile memory. In some embodiments, the non-volatile memory of the cache storage media 214 may be configured with solid state media, such as Flash-based memory (e.g., NAND Flash) or 3D XPoint. In some embodiments, the removable cache memory device 210 may be configured as a secure digital (SD) card, a CFX card, or as a card that employs other non-volatile memory technologies having an embedded controller. The second controller 212 may be configured to perform the media management functions (e.g., read/write) for the removable cache memory device 210 responsive to commands received from the bulk memory device 200.

The cache port 206 may, optionally, be integrated (e.g., as a slot, a port, etc.) with the form factor of the bulk memory device 200 such that the removable cache memory device 210 may be inserted into the cache port 206 to transform the bulk memory device 200 into a hybrid drive. In some embodiments, the cache port 206 may be exposed to an outside of the form factor (e.g., box) of the memory device 210. When connected, the bulk memory device 200 and the removable cache memory device 210 may be essentially a single unit, which may enable the drive manufacturer and/or OEM to determine whether the drive for a particular product should be a stand-alone drive or a hybrid drive. In addition, the drive manufacturer and/or OEM may determine the capacity of the hybrid drive by mixing and matching bulk memory devices 200 with removable cache memory devices 210 having the desired combination of bulk storage capacity and cache storage capacity while maintaining a common form factor.

The bulk memory device 200 includes firmware (e.g., stored in the bulk storage media 204 or other memory) configured to detect the presence of the removable cache memory device 210 and cause the first controller 202 to reconfigure the operation of the bulk memory device 200 in either a stand-alone mode or a hybrid mode depending on the presence of the removable cache memory device 210 in the cache port 206. As a result, the bulk memory device 200 may run the software to operate as either a stand-alone drive or a hybrid drive to determine where data is stored and retrieved during operation. Thus, the host may not need to have its software reconfigured, which may result in a simpler implementation for the OEM and/or the drive manufacturer when assembling the hybrid drive. In addition, because the removable cache memory device 210 has its own controller (i.e., second controller 212) configured to perform the media management functions for the removable cache memory device 210, the firmware of the bulk memory device 200 may be simplified in hybrid mode as the built-in firmware on the removable cache memory device 210 may already be able to perform the cache functions responsive to receiving commands from the bulk memory device 200.

The buses 201, 205 coupling the first controller 202 to the external devices (e.g., chipset 102 (FIG. 1), removable cache memory device 210) may be configured with one or more different interface configurations, such as PCIe, SATA, PATA, SCSI, SAS, or combinations thereof. Other interface configurations and protocols are also contemplated. In some embodiments, the first bus 201 and the third bus 205 may be configured according to the same type of interface and communicate via the same protocol. For example, both the first bus 201 and the third bus 205 may be configured as a PCIe bus and the first controller 202 may be configured to communicate using a non-volatile memory express (NVME) protocol. In some embodiments, the first bus 201 and the third bus 205 may be configured according to a different type of interface and communicate via a different protocol. For example, the first bus 201 may be configured as a SATA bus for the first controller 202 to communicate with the I/O controller hub 106, and the third bus 205 may be configured as a PCIe bus for the first controller 202 to communicate with the removable cache memory device 210. In such an embodiment, the first controller 202 may be configured to perform a translation between the different protocols used to communicate over the different interfaces.

In order for the cache storage media 214 to be used to cache data during operation to speed up the operation of the hybrid drive 110, the cache storage media 214 may be configured with faster memory than the bulk storage media 204. In such an embodiment, a suitable NAND-based Flash device may be used as the removable cache memory device 210 in combination with an HDD drive including the internal bulk storage media. Many NAND-based Flash devices are faster than an HDD drive, which means that many NAND-based Flash devices may provide a valid combination with the HDD drive to improve its speed with the removable cache memory device 210. In another embodiment, a suitable NAND, 3D Xpoint, or other non-volatile memory based device may be used as the removable cache memory device 210 in combination with an SSD drive including the internal bulk storage media. Some NAND-based Flash devices may be slower than an SSD drive depending on the specific type of memory used in each. As a result, using slower memory as the removable cache memory device 210 in comparison to the bulk memory device 200 may not actually improve performance relative to just using the bulk storage media 204 for both bulk storage and cache storage. Thus, the storage controller 202 may determine that the specific combination of the bulk memory device 200 with the removable cache memory device 210 is invalid. Similarly, the storage controller 202 may determine that the storage media in the removable cache device 210 has other characteristics (e.g., capacity, endurance) that make it unsuitable for use as a cache for the bulk memory device 200, and determine the combination invalid.

Embodiments of the present disclosure also include methods of operating a multi-mode hybrid drive. Such a method may comprise monitoring a cache port of a bulk memory device to determine a presence of a removable cache memory device, operating the bulk memory device as a stand-alone drive responsive to determining the removable cache memory device is not present, and operating the bulk memory device as a hybrid drive using the removable cache memory device as a data cache responsive to determining the removable cache memory device is present and valid.

Figure 3:
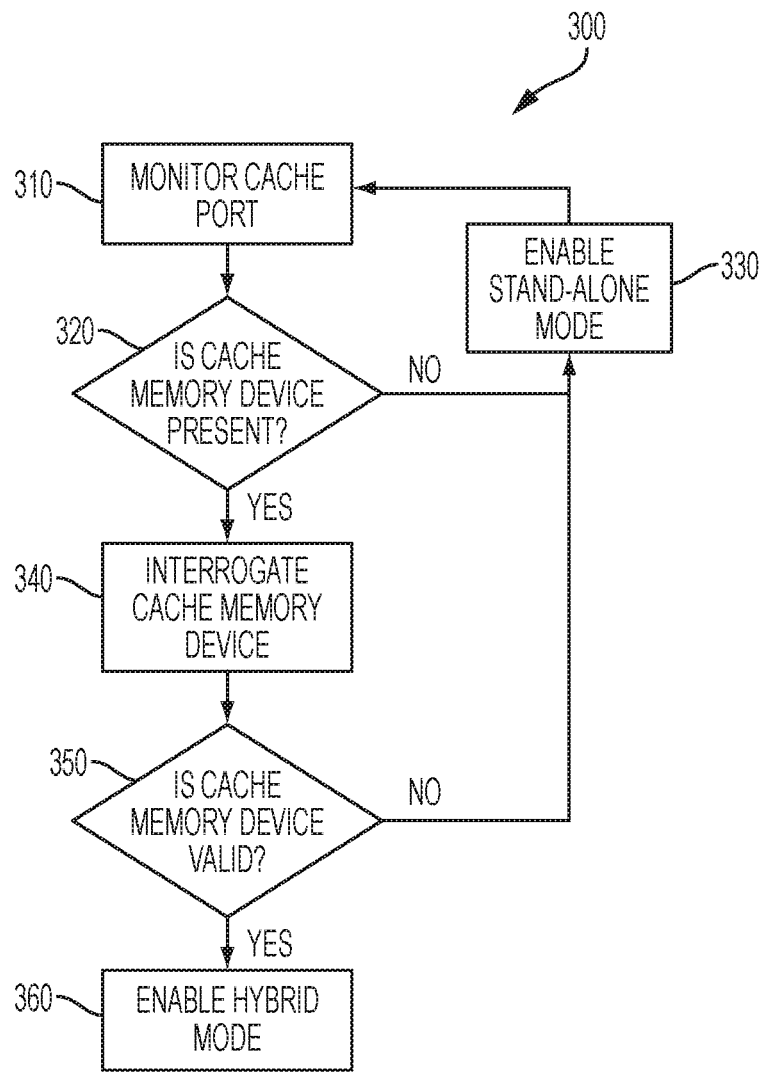
FIG. 3 is a flowchart illustrating a method of operating a bulk memory device as either a stand-alone drive or a hybrid drive according to an embodiment of the present disclosure.

FIG. 3 is a flowchart 300 illustrating a method of operating a bulk memory device as either a stand-alone drive or a hybrid drive according to an embodiment of the present disclosure. At operation 310, the bulk memory device may monitor the cache port. As discussed above, the cache port may be integrally formed within the form factor of the bulk memory device to receive a removable cache device inserted therein. Such monitoring may be initiated at power up of the bulk memory device as well as throughout operation of the bulk memory device.

At operation 320, the bulk memory device may determine if the removable cache memory device is present in the cache port. If not, the stand-alone mode of the bulk memory device may be enabled at operation 330, and the bulk memory device may continue to monitor the cache port until a removable cache memory device is present. During stand-alone mode, data accesses (e.g., read/write) may be performed in the bulk storage media of the bulk memory device only.

At operation 340, the bulk memory device may interrogate the cache memory device. For example, the first controller of the bulk memory device may talk with the second controller of the removable cache memory device to determine operational parameters (e.g., capacity, type, endurance, speed, etc.) of the removable cache memory.

At operation 350, the bulk memory device may determine if the removable cache memory device is valid for the intended usage scenario. For example, the bulk memory device may determine if the type of memory is compatible with the controller of the bulk memory device. The bulk memory device may also determine if the capacity, endurance, and/or speed is above a desired threshold and/or within a desired range of operation. For example, if the speed of the removable cache memory device is slower than the speed of the bulk memory device, then the bulk memory device may be better off operating in its stand-alone mode because using the removable cache memory device to cache data in hybrid mode may not improve performance. Similarly, if the capacity of the removable cache memory device is below a predetermined threshold for its intended use, then the bulk memory device may be better off operating in its stand-alone mode.

At operation 360, the bulk memory device determines that the removable cache memory device is valid for the intended use case, the hybrid mode may be enabled. As a result, the first controller of the bulk memory device may coordinate data accesses between the removable cache memory device and/or the internal bulk storage media. For example, if a read operation is received from the host, the first controller may determine if the requested data is available in the removable cache memory device. If so, the first controller may retrieve the requested data from the removable cache memory device. If the requested data is not available in the removable cache memory device, the first controller may retrieve the requested data from the internal bulk storage media. In some embodiments, the first controller may also store (e.g., move, copy, etc.) the requested data from the internal bulk storage media into the removable cache memory device for future access. If a write operation is received from the host, the first controller may determine where the incoming data should be stored (e.g., in the removable cache memory device, the bulk storage media, or both). Such a determination may depend on the priority given to certain data types according to the firmware of the bulk memory device when operating in hybrid mode. In some embodiments, the first controller may perform a garbage collection process to move data from the removable cache memory device to the internal bulk storage media after a predetermined period has elapsed without use of the hybrid drive and/or during which data stored in the removable cache memory device has not been accessed. At any point in the process, a notification may be issued to the host if the bulk memory device detects the removal of the removable storage device from the bulk memory device.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalents.

What is claimed is:

1. A memory drive, comprising:
    a bulk memory device including:
        bulk storage media; and
        a controller operably coupled with the bulk storage media, wherein the controller is configured to:
            operate the bulk memory device in a stand-alone mode responsive to determining a removable cache memory device is not coupled with the bulk memory device; and
            operate the bulk memory device in a hybrid mode responsive to determining the removable cache memory device is coupled with the bulk memory device.

2. The memory drive of claim 1, further comprising a cache port operably coupled with the controller, and configured to receive the removable cache memory device inserted therein.

3. The memory drive of claim 2, further comprising:
    a first bus coupling the controller to a host;
    a second bus coupling the controller to the bulk storage media; and
    a third bus coupling the controller to the cache port.

4. The memory drive of claim 3, wherein the first bus and the second bus are of the same bus type.

5. The memory drive of claim 3, wherein the first bus is of a different bus type than the third bus.

6. The memory drive of claim 5, wherein the bus types include one or more of a Peripheral Component Interconnect Express (PCIe) bus, a Serial Advanced Technology Attachment (SATA) bus, a Parallel Advanced Technology Attachment (PATA) bus, a Small Computer System Interface (SCSI) bus, a Serial-attached SCSI (SAS) bus, and a Universal Serial Bus (USB).

7. The memory drive of claim 3, wherein the controller is further configured to translate communications between the host and the removable cache memory device using different communication protocols.

8. An apparatus, comprising:
a controller operably coupled with bulk storage media of a hybrid memory drive, and configured to:
operate the hybrid memory drive to use a removable cache memory device as a data cache in hybrid mode with the bulk storage media responsive to the removable cache memory device being coupled with the controller; and
operate the hybrid memory drive to use the bulk storage media in stand-alone mode responsive to the removable cache memory device not being coupled with the controller.

9. The apparatus of claim 8, wherein the controller is configured to:
operate the hybrid memory drive to use the bulk storage media in the hybrid mode responsive to determining the removable cache memory device to be valid for hybrid mode based on predetermined criteria in addition to being coupled with the controller; and
operate the hybrid memory drive to use the bulk storage media in stand-alone mode responsive to determining the removable cache memory device to be invalid for hybrid mode based on the predetermined criteria even while being coupled with the controller.

10. The apparatus of claim 9, wherein the predetermined criteria include one or more operational parameters of the removable cache memory device.

11. The apparatus of claim 10, wherein the operational parameters include at least one of a capacity parameter, an endurance parameter, or a speed parameter of the removable cache memory device.

12. The apparatus of claim 10, wherein the predetermined criteria include a memory type of the removable cache memory device being supported by the controller.

13. A method of operating a multi-mode hybrid drive, the method comprising:
operating a bulk memory device of the multi-mode hybrid drive in a stand-alone mode responsive to a removable cache memory device being coupled to a controller of the multi-mode hybrid drive; and
operating the bulk memory device in hybrid mode using the removable cache memory device as a data cache responsive to the removable cache memory device being coupled to the controller.

14. The method of claim 13, further comprising determining whether the removable cache memory device is valid or invalid for hybrid mode based on predetermined criteria.

15. The method of claim 14, wherein operating the bulk memory device in hybrid mode is further responsive to both the removable cache memory device being coupled to the controller and being determined to be valid for hybrid mode based on the predetermined criteria.

16. The method of claim 15, further comprising operating the bulk memory device of the multi-mode hybrid drive in the stand-alone mode responsive to the removable cache memory device being determined to be invalid for hybrid mode based on the predetermined criteria.

17. The method of claim 14, wherein determining whether the removable cache memory device is valid for hybrid mode depends, at least in part, on a speed of cache storage media within the removable cache memory device being at least one of above a predetermined threshold or within a predetermined range.

18. The method of claim 14, wherein determining whether the removable cache memory device is valid for hybrid mode depends, at least in part, on a capacity of cache storage media within the removable cache memory device being above an amount needed for an intended operation.

19. The method of claim 14, wherein operating the bulk memory device in hybrid mode includes the controller coordinating data accesses between a host, the removable cache memory device, and bulk storage media of the bulk memory device.

20. The method of claim 14, wherein operating the bulk memory device in hybrid mode includes the controller performing a garbage collection process by moving data from the removable cache memory device to bulk storage media of the bulk memory device after a predetermined period has elapsed without use of the multi-mode hybrid drive and/or during which data stored in the removable cache memory device has not been accessed.

* * * * *